United States Patent [19]

Rufer et al.

[11] 4,277,513

[45] Jul. 7, 1981

[54] PROCESS FOR THE MANUFACTURE OF A FOODSTUFF HAVING A FIBROUS STRUCTURE SIMILAR TO THAT OF MEAT

[75] Inventors: Willy Rufer, Onex; Robert Menzi, Geneva, both of Switzerland

[73] Assignee: Battelle Memorial Institute, Carouge, Switzerland

[21] Appl. No.: 100,460

[22] Filed: Dec. 5, 1979

Related U.S. Application Data

[63] Continuation of Ser. No. 873,073, Jan. 27, 1978, abandoned.

[30] Foreign Application Priority Data

Jan. 31, 1977 [CH] Switzerland ............... 1122/77

[51] Int. Cl.$^3$ ............................................. A23J 3/00
[52] U.S. Cl. ................................. 426/656; 426/643; 426/646; 426/657; 426/802; 426/243; 426/515
[58] Field of Search ............... 426/104, 574, 243, 646, 426/656, 657, 513, 515, 524, 802, 643

[56] References Cited

U.S. PATENT DOCUMENTS

| | | | |
|---|---|---|---|
| 2,682,466 | 6/1954 | Boyer | 426/104 |
| 2,952,542 | 9/1960 | Giddey | 426/274 |
| 3,615,686 | 10/1971 | Marshall | 426/646 X |
| 3,870,808 | 3/1975 | Boyer et al. | 426/657 X |
| 3,898,345 | 8/1975 | Horrocks et al. | 426/802 X |
| 3,920,853 | 11/1975 | Middendorf et al. | 426/104 |
| 3,924,011 | 12/1975 | Kern et al. | 426/104 |
| 4,001,459 | 1/1977 | Kim et al. | 426/656 |
| 4,018,906 | 4/1977 | Ostendorf | 426/656 X |
| 4,021,584 | 5/1977 | Rankowitz | 426/656 X |
| 4,073,962 | 2/1978 | Spata et al. | 426/657 X |

FOREIGN PATENT DOCUMENTS

| | | | |
|---|---|---|---|
| 7230191 | 3/1974 | France. | |
| 952204 | 3/1964 | United Kingdom | 426/646 |

*Primary Examiner*—Esther M. Kepplinger
*Attorney, Agent, or Firm*—Finnegan, Henderson, Farabow, Garrett & Dunner

[57] ABSTRACT

A process for the manufacturing of a meat-analog foodstuff using an aqueous protein paste as the starting material. In this process, the aqueous paste which is prepared by grinding meat, poultry or fish offals is cooled until it partly solidifies as a plastic mass whereafter it is subjected to mechanical forces which cause the protein fibrils of the mass to reorient themselves in a preferred direction thus imparting to the mass a texture resembling that of muscular fibers.

17 Claims, No Drawings

PROCESS FOR THE MANUFACTURE OF A FOODSTUFF HAVING A FIBROUS STRUCTURE SIMILAR TO THAT OF MEAT

This is a continuation of application Ser. No. 873,073, filed Jan. 27, 1978, now abandoned.

The present invention concerns a process for manufacturing a foodstuff with a fibrous structure analogous to that of meat, using as a starting material a non-structured wet protein mass.

It is known that, in view of the scarcity of protein-rich foodstuffs, particularly in the penurious countries with a high density of population, methods for manufacturing meat-analog foodstuffs from butchery cuttings or refuses and vegetal or microbiological proteins have been actively developed.

However, although such products have an undisputable nutritional value, and though they taste and smell like meat, their structure and their chewing properties are well different from that of meat. This is so because such products are most often obtained from crushed and milled protein materials which are, thereafter, simply and conveniently agglomerated and conditioned in the form of edible products. Therefore, such meat-analogs do not have a fibrous structure similar to good quality meat and they are not very appetizing.

Attempts to remedy these drawbacks have been made in different manners: Thus, U.S. Pat. No. 3,973,004 discloses a process in which a wet protein mix or dough containing 40–80% water is treated in a machine comprising a series of oppositely rotating rolls which exert on the mass a succession of differential laminating and stretching deformations. This action leads to a restructuration and to a reorientation of the protein constituents. After stretching, the protein film is folded and compacted such as to imitate a piece of meat. This process gives excellent results but requires a rather sophisticated equipment and accurately defined operating conditions which make it expensive. Another process (U.S. Pat. No. 2,682,466) comprises the spinning of pulped proteins into filaments which are put together in bundles, thus producing a fibrous material similar to meat. However this process is complex and expensive.

The present process remedies these drawbacks, mainly because of the simplicity of its application.

This process comprises cooling a non-structured wet protein mass or dough below zero centigrade until part of the water contained therein has solidified and, when in such condition, subjecting the partly plastified mass to force and pressure so as to produce a mechanical deformation thereof and to cause the fibrils of the material under stress to rearrange and orient themselves in a manner such as to impart to the protein product a texture similar to that of muscular fibers.

Preferably, the dough will contain about 60 to 90% of water, 15 to 40% of which will be solidified when being subjected to the above treatment.

There exists already a process for imparting to mixtures of meats, offals or vegetable proteins an external aspect very similar to that of beef which comprises providing at the surface thereof a series of cuttings by means of well sharpened knives (French Pat. No. 2,196,756).

However, this known process clearly distinguishes from the invention because it only involves a surface treatment and a partial carving of the material and it does not involve a basic process in which forces and pressures strongly act on the body of the protein mass so as to generally modify its intimate structure as in the present invention.

On the other hand, there also exists a method for the restructuration of wet protein materials by cooling only. This method is based on the slow cooling below 0° C. of a protein suspension in water and it appears that the crystals of ice which form and grow therein are responsible for the molecular reorientation of the organic components of the mixture. However, this method is very slow and not much efficient in all cases.

On the contrary, the present process is particularly efficient and well adapted to the treatment of protein doughs containing much water and which have a rather liquid consistency at room temperature as is the case for ground meat offals.

It is advantageous in the present process that pressure be exerted to the plastified half-frozen material in a way such as to cause the ice thereof to partially melt at the areas subjected to pressure. This local melting results in the presence of portions of the mass where a gradient of molecular motion will develop and it can be visualized that proteic fibrils tend to rearrange in conformity with the geometry of such portions, that is, for instance, to controllably align along some preferred directional parameters thereof. These considerations are however fully speculative and are discussed here for the only purpose of trying to explain the possible reasons why the above restructuration occurs. Now, whatever the reasons for such rearrangement to occur, it is advantageous for applying the pressure on the plastified paste to spread a layer of the fluid paste to be restructured onto a cold surface and, after proper cooling, and hardening to impress therein a series of parallel grooves.

For this, one can squeeze the cold layer of dough between two grooved surfaces or between a smooth surface and a grooved surface. Such surfaces can be flat shaped (e.g. press-dies) or curved (rotating cylinders). On a small scale, the layer to be restructured can be layed out on a cold metal plate until it acquires the required ductility and it can be provided with the required parallel grooves by means, for instance, of a tool with parallel blades. It should be reminded that the blades must not curve the material but rather dig therein in order to provide deformation and embossement thereof. The protein fibrils are therefore subjected to strong mechanical effort and to a consequent supply of energy which condition might explain the reason why they tend to realign and rearrange into bundles of fibers. As a hand-tool with parallel blades, one can use a set of parallel discs rotatably mounted over a cylindrical shaft provided with terminal handles like a baker's roll. The spacing between the discs and therefore the spacing between the grooves will be determined by spacers inserted between the discs or by using bulging discs which are thicker at the center than at the periphery. Naturally, any other tool giving similar results would be convenient. It should be remarked that the stamping can be done by one or several successive mechanical operations. Further, it is not required that successive applications be necessarily superimposed exactly. For instance, it is quite possible to first roll the tool on the material in one direction and to repeat the operation by rolling in another direction, the second set of grooves thus being at angle with the first set. The product will then have a hilly surface rather that a grooved one.

The temperature at which the dough to be texturized must be cooled depends on the nature of its protein constituents, its water concentration and the additional ingredients (salt, flavors, stabilizers, etc.). Roughly, it can be comprised between 0° C. and −10° to −15° C., as measured at the level of the cooling substrate with which the paste is in contact during cooling. The important factor to be considered there is rather the combination of temperature of the cooling agent and the application time required to achieve the requisite consistency for the texturizing treatment. For instance, the cooling can be performed by contacting with a cold surface or by sweeping with a cooling fluid, that is a cooling gas or a refrigerating liquid. It is very important to understand that the temperature of the material to be structured will stay approximately constant for the full extent of the cooling operation leading to the partial solidification of the water contained therein. This is so, because the heat corresponding to the heat of melting of the ice thereof will be given off at practically constant temperature for the full extent of the freezing period. Therefore, this freezing temperature will be essentially controlled by the amount of dissolved substances in the water-protein mix (salts, flavors, stabilizers, anti-oxidants, etc); for instance, it is well known that a 3% solids like salt dissolved in water will depress its freezing point by approximately 2° C. When one uses for the cooling a refrigerated supporting plate, the latter will be selected with a relatively low thermal inertia in order that the material will not undergo instant freezing with consequent sticking to the plate and that both meat and support can be easily separated from each other after the texturizing process. Thus, if the protein mass is deposited in layers about 5–6 mm thick on a stainless steel plate cooled to −15° to −20° C., the dough will acquire the right rigidity for restructuration after about 10–15 min. However, if one operates on a strip of material by means of rapidly moving rolls or stamping in a press, it will be convenient to cool the material at much faster rate, e.g. in a few seconds or less, depending on the thickness of the strip by using a refrigerating fluid such as liquid propane or freon.

The protein materials usable in the process of the invention are mainly meat products such as cuttings and offals of butchery, boned meat and fish or poultry refuses. Such products are first reduced to a finely ground paste by means of a classical grinder or mill. In some cases, comminuted unground meat can be used but the texture of the finished meat-analog will be coarser and less attractive. On the other hand, it is possible to also handle other protein substances such as eggs or vegetal proteins, namely peanut and soybean proteins or proteins from other oils-seeds, such proteins having been micro-fibrillated prior to texturizing by usual means (e.g. U.S. Pat. Nos. 2,682,466; 2,952,542; 3,102,031). It is generally preferred, when using ordinary vegetal proteins, to treat mixes of animal and vegetal proteins.

It is naturally possible to add to the proteins to be texturized the usual ingredients generally added to meat-analog products. As such, the following can be recited: organoleptic agents, e.g. salt, glutamate, spices and flavors; stabilizing agents, e.g. phosphates and polyphosphates; humidifying agents, e.g. glycerol, polyglycols, 1,2-propylene-glycol, glucose, maltose, etc.

Once the protein material has been restructured, i.e. when it has been provided with a fibrous texture similar to that of meat, it can be frozen and stored at low temperature until it is used, otherwise the fibrous structure can be heat set. It should be kept in mind that such a setting of the fibrous structure is by all means necessary for the material to keep its favorable properties until it is eaten. Then, since the setting is normally provided by heat, it can take place at the last moment, that is when the foodstuff is cooked for eating. Alternatively, the structure setting can be provided by a short thermal shock, i.e. by means of a micro-wave oven; in this case, the heat set foodstuff can be stored unfrozen but, naturally, under usual sanitary conditions, e.g. under vacuum. It should be further remarked that it is possible to texturize the hardened protein dough by mechanical means other than the preferred ones described hereinabove. For instance, one can also force the product through a die or a rolling-mill. However, in such case the product has to be subjected to very high pressure because of the high viscosity of the dough at the low temperatures. Further, the shaping of the foodstuff (in steak-form for instance) starting with rolled strips or extruded bodies is more difficult than with the corrugated bands or sheets obtained as described hereinbefore.

Thus, the finished product which results form the present process can be preferably obtained from the stacking together of several restructured plates. In general, for purely practical reasons, it is advantageous to superimpose 2, 3 or more texturized plates for forming an edible block, for instance in steak form, having a thickness comparable to that of genuine steaks and susceptible to be roasted easily. Now, in order to obtain a steak about 20 mm thick from a single layer, it would be necessary to impress therein grooves about 15–16 mm deep which would result in an unpleasant looking ridged piece. It is therefore preferable to stack together 3 to 4 layers 5–6 mm thick which will be treated successively, the next over the previous one, in the same direction which will ensure their mutual adhesion. Thus, each layer will be individually provided with much finer grooves and the aspect of the finished food product will not be altered. It should be mentioned that, in order that good adhesion between the successive layers be provided, it will be preferable to always lay the new layer still at room temperature over the previous layer which has been cold-texturized beforehand because too cold the new layer would prevent it from correctly sticking to the older one.

The Examples that follow will illustrate the invention in a more detailed manner.

EXAMPLE 1

One kg of meat offals selected from fresh butchery cheap cuts were mixed with conditioning agents, salt, flavors, stabilizers, etc. and introduced in a high speed cutter (Blitz mill). After 15 minutes grinding, the cutter was stopped and a fluid, homogeneous mass of protein dough was withdrawn from the cutter. This mass contained about 70% water. The mass was divided into portions of about 300 g each and the first portion was deposited on a stainless steel plate at −20° C. as a roughly 8×30 cm layer of thickness approximately 5 mm. After about 15 min cooling time, the layer had become semi-solid.

Then, parallel grooves about 4–4.5 mm deep were impressed in the hardened dough layer by means of a hand tool consisting of a shaft provided with a plurality of parallel rotatably mounted metal discs (about 12–15) spaced about 5–6 mm which was rolled on the mass with pressure. Straight grooves resulted from a straight motion of the tool. Alternatively, parallel sinus-shaped grooves could be obtained by combining the forward motion of the tool with a slow oscillating side motion. The second type of embossing was slightly more effective for providing the desired texturized structure by achieving some kind of repeated groove counter-crossing. During this operation, the manual vertically exerted pressure was approximately 2-3 kg which was found convenient for hand application.

Then a second similar portion of the protein dough was spread over the first one and, after contact cooling, a new series of grooves were impressed therein as described above. Finally, the operation was repeated with a third layer of about 300 g of dough. During the treatment of the 2nd and 3rd layers, the latter adhered on the earlier in reason of the pressure to which they were subjected when grooved.

After texturizing, the block was cut to the desired size, e.g. 8×10 cm and the three-layered structure was placed in a micro-wave oven (Mark: "MIWELL", power 3.4 KW, frequency 2450 MHz) and was subjected to irradiation for 30 sec to 3 min.

After this thermal shock, the structure was definitively set and the piece had the aspect of a beef-steak. In these conditions, the product could be conditioned for sale, e.g. it could be deep-frozen or wrapped under vacuum and stored at about 4° C. It could also be roasted and eaten immediately.

EXAMPLE 2

A dough of fresh turkey meat (1 kg) was used. This was obtained, after separating the noble parts (legs, wings and fillets), by removing the meat remainders still attached to the bones and grinding in a high speed cutter. As in the previous Example, the mass was divided into 300 g portions which were successively texturized while stacking upon each other. In this case, the number of layers could be increased to any desirable total thickness. After cutting to the desired size, e.g. 6×15 cm, the pieces were made ready for sale i.e. they were either deep-frozen or vacuum-packed for storage at 4° C.

When the structure was heat-set, for instance by cooking, the product resembled a turkey fillet.

EXAMPLE 3

Fish offals (1 kg) obtained by scraping the flesh remainders off the fish-bones after removing the fillets were treated as described in the previous Examples. After texturization, the blocks were cut into sticks (e.g. 3×8 cm), coated with bread-crumbs and deep-frozen for sale. After heat setting the structure by cooking, the product resembled genuine fish sticks.

EXAMPLE 4

Example 1 was repeated by using a mixed dough containing 20% soybean protein and 80% beef meat. The mixing was done during grinding of the meat cuttings. The other operations were identical to that described in Example 1 and the finished product resembled a beef-steak although it did not taste exactly like pure meat.

EXAMPLE 5

In this Example, cuttings of chicken were used exactly like in the method of Example 2. After preparation of the texturized blocks, the latter were cut into small pieces (e.g. 3×4 cm) and mixed with a sauce containing seasoning ingredients; thereafter the foodstuff was pasterized and vacuum-packed.

We claim:

1. A process for the manufacture of a protein foodstuff with a fibrous texture analogous to that of meat which comprises forming a wet mass of ground, non-structured protein material containing water into a layer, cooling said layer of material to a temperature below 0° C. until at least a portion but not all of the water contained therein solidifies to form a partially plasticized mass and, while in such condition, acting on the plasticized mass layer with means which applies a mechanical force at spaced locations along the mass layer and which does not carve or cut said mass layer but digs into said mass layer to a substantial depth beyond its surface, said mechanical force being sufficient to cause mechanical deformation of said plasticized mass layer and to cause the protein fibrils in the mass layer to rearrange and orient themselves in a manner and to an extent sufficient to impart to the whole body of the protein material a texture resembling that of meat.

2. The process of claim 1 wherein the mechanical force is applied in a manner sufficient to cause the ice in the areas subjected to the force to melt.

3. The process of claim 1 wherein the mechanical force is applied to at least one surface of the layer.

4. The process of claim 3 wherein the applied mechanical force forms substantially parallel grooves on at least one surface of the layer.

5. The process of claim 4 wherein the grooves are formed by rotating a plurality of rotatably mounted discs over the surface of said layer while pressing the discs into the layer to form grooves therein.

6. The process of claim 5 in which the discs, in addition to rotating, oscillate laterally to form sinuous shaped parallel grooves in the layer.

7. The process of claim 4 wherein the grooves are formed by pressing a grooved surface into the layer.

8. The process of claim 3 which comprises heat-setting the texturized layer by heating to a temperature sufficient to allow the layer to set.

9. The process of claim 8 wherein heat-setting is done by microwave energy.

10. The process of claim 3 wherein the texturized layers are stacked one upon another all having their fiber structure oriented in the same direction to form a meat analog foodstuff.

11. The process of claim 1 wherein the water content of the protein mass is about 60 to 90% and from 15 to 40% of the water content is solidified during cooling.

12. The process of claim 1 wherein the wet mass is cooled to a temperature of from 0° C. to about −15° C.

13. The process in claim 1 in which the protein material is animal or vegetable protein or mixtures thereof.

14. A process for the manufacture of a protein foodstuff with a fibrous texture analogous to that of meat which comprises forming a layer of a wet mass of protein material having a water content of about 60 to 90%, cooling the layer to a temperature below 0° C. until about 15 to 40% of the water contained therein solidifies to form a partially plasticized layer and while in such condition, applying pressure to the layer forming substantially parallel grooves in at least one surface thereof sufficient to cause mechanical deformation of the layer and to cause the protein fibrils in the layer to rearrange and orient themselves in a manner and to an extent sufficient to impart to the whole body of the protein material a texture resembling that of meat.

15. The process of claim 14 in which the layer has a thickness of about 5 to 6 mm.

16. The process of claim 15 in which the grooves formed in the surface of the layer are from about 4 to 4.5 mm. deep.

17. The process of claim 14 in which the layer is cooled by placing it on a stainless steel plate cooled to at least −15° C. to −20° C. for a period of from about 10 to 15 minutes.

* * * * *

Dedication 4,277,513.—*Willy Rufer*, Onex and *Robert Menzi*, Geneva, Switzerland. PROCESS FOR THE MANUFACTURE OF A FOODSTUFF HAVING A FIBROUS STRUCTURE SIMILAR TO THAT OF MEAT. Patent dated July 7, 1981. Dedication filed Mar. 26, 1984, by the assignee, *Battelle Memorial Institute.*

Hereby dedicates to the People of the United States the entire remainig term of said patent.

[*Official Gazette May 29, 1984.*]